United States Patent
Choraku et al.

(10) Patent No.: US 9,285,560 B2
(45) Date of Patent: Mar. 15, 2016

(54) METHOD AND DEVICE FOR MANUFACTURING OPTICAL TRANSMISSION DEVICE, AND OPTICAL TRANSMISSION DEVICE

(71) Applicant: FUJITSU LIMITED, Kawasaki-shi, Kanagawa (JP)

(72) Inventors: Kohei Choraku, Yokohama (JP); Daisuke Usui, Kawasaki (JP); Masahiro Iwama, Kawasaki (JP); Takahiro Ooi, Kawasaki (JP); Tetsuro Yamada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/136,218

(22) Filed: Dec. 20, 2013

(65) Prior Publication Data

US 2014/0270631 A1     Sep. 18, 2014

(30) Foreign Application Priority Data

Mar. 18, 2013   (JP) ................................. 2013-055398

(51) Int. Cl.
    *G02B 6/42*     (2006.01)
    *G02B 6/46*     (2006.01)
    *G02B 21/36*    (2006.01)
    *G02B 6/43*     (2006.01)

(52) U.S. Cl.
    CPC ................ *G02B 6/46* (2013.01); *G02B 6/4221* (2013.01); *G02B 6/4214* (2013.01); *G02B 6/43* (2013.01); *G02B 21/36* (2013.01); *Y10T 29/49769* (2015.01); *Y10T 29/53022* (2015.01)

(58) Field of Classification Search
    CPC ............... H01L 21/00; H04N 13/0203; G02B 2027/0138; G02B 2027/014; G02B 21/36; G02B 21/361; G02B 23/2461; G02B 23/2469
    See application file for complete search history.

(56) References Cited

U.S. PATENT DOCUMENTS

| | | | |
|---|---|---|---|
| 7,809,225 B2 * | 10/2010 | Bouma et al. | 385/123 |
| 2008/0158566 A1 * | 7/2008 | Suzuki et al. | 356/450 |
| 2010/0296727 A1 * | 11/2010 | Stern et al. | 382/154 |
| 2011/0279355 A1 * | 11/2011 | Yasue et al. | 345/8 |
| 2012/0018651 A1 * | 1/2012 | Hess et al. | 250/459.1 |
| 2012/0249408 A1 * | 10/2012 | Moliton et al. | 345/156 |

FOREIGN PATENT DOCUMENTS

| | | | |
|---|---|---|---|
| JP | H08-082724 A | 3/1996 | |
| JP | 2008-090218 A | 4/2008 | |

* cited by examiner

*Primary Examiner* — Thomas A Hollweg
*Assistant Examiner* — Mary A El Shammaa
(74) *Attorney, Agent, or Firm* — Fujitsu Patent Center

(57) ABSTRACT

A method for manufacturing an optical transmission device, includes: arranging a plurality of optical waveguides including waveguide mirrors, a transmission-side optical module and a reception-side optical module on one side of a substrate; photographing, with a photographic device, at least one waveguide mirror, and the transmission-side optical module or the reception-side optical module corresponding to the waveguide mirror, from another side of the substrate via an opening formed in the substrate; detecting optical-axis centers of the transmission-side optical module or optical-axis centers of the reception-side optical module, and central positions of reflective surfaces of the waveguide mirrors corresponding to the detected optical-axis centers, from a result of the photographing; and aligning and fixing a position relationship between the optical waveguides and the transmission-side optical module or the reception-side optical module based on a result of the detecting.

8 Claims, 10 Drawing Sheets

METHOD AND DEVICE FOR MANUFACTURING OPTICAL TRANSMISSION DEVICE, AND OPTICAL TRANSMISSION DEVICE

CROSS-REFERENCE TO RELATED APPLICATION

This application is based upon and claims the benefit of priority of the prior Japanese Patent Application No. 2013-055398 filed on Mar. 18, 2013, the entire contents of which are incorporated herein by reference.

FIELD

A certain aspect of the embodiments is related to a method and a device for manufacturing an optical transmission device, and an optical transmission device.

BACKGROUND

Recently, with increase of data volume processed with information equipment, the exchange of high-speed data is needed inside the equipment. On the contrary, lately, an optical interconnect technology in which optical interconnection is used for the exchange of data in the inside of the information equipment is adopted (see e.g. Japanese Laid-open Patent Publication No. 2008-90218, and Japanese Laid-open Patent Publication No. 08-82724).

SUMMARY

According to an aspect of the present invention, there is provided a method for manufacturing an optical transmission device, including: arranging a plurality of optical waveguides, a transmission-side optical module and a reception-side optical module on one side of a substrate, the optical waveguides including waveguide mirrors, the transmission-side optical module including a plurality of light sources which emit lights to be transmitted with the optical waveguides, respectively, the reception-side optical module including a plurality of light receiving elements which receive the lights transmitted with the optical waveguides, respectively: photographing, with a photographic device, at least one waveguide mirror, and the transmission-side optical module or the reception-side optical module corresponding to the waveguide mirror, from another side of the substrate via an opening formed in the substrate; detecting optical-axis centers of the transmission-side optical module or optical-axis centers of the reception-side optical module, and central positions of reflective surfaces of the waveguide mirrors corresponding to the detected optical-axis centers, from a result of the photographing; and aligning and fixing a position relationship between the optical waveguides and the transmission-side optical module or the reception-side optical module based on a result of the detecting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

It is desirable to reduce optical loss in an optical transmission system as much as possible to realize high-speed transmission (e.g., more than 10 Gbps) in the optical transmission system using an optical interconnect technology. As the optical loss by the optical transmission system, there are a coupling loss that couples an optical module with a waveguide, a propagation loss when a light propagates the waveguide, and a coupling loss and a reflection loss when the waveguide is coupled. Especially, it is considered that the optical loss by the coupling loss of the optical module and the waveguide is large. Therefore, it becomes important in realization of high-speed transmission how the optical loss by the coupling loss of the optical module and the waveguide is controlled.

Figure 1:
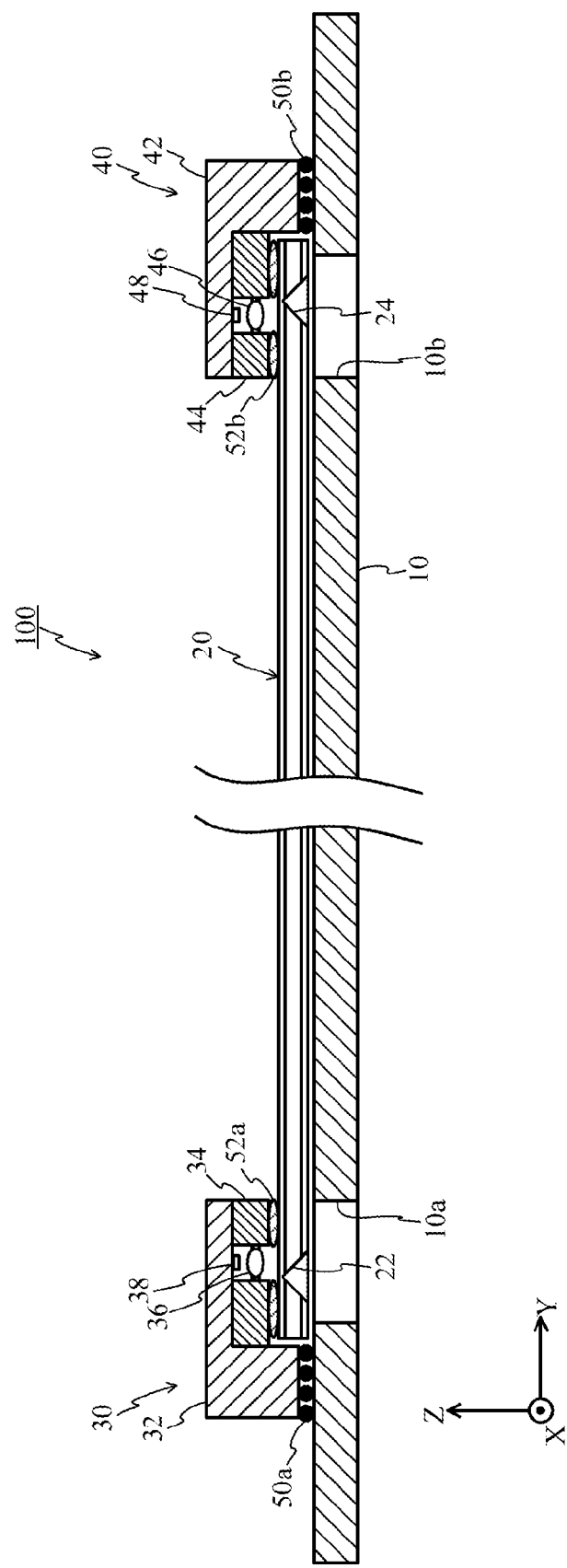
FIG. 1 is a diagram schematically illustrating the configuration of an optical transmission device according to an embodiment.

Hereinafter, a detailed description will be given of an embodiment based on FIGS. 1 to 8. FIG. 1 is a diagram schematically illustrating the configuration of an optical transmission device 100 according to an embodiment.

The optical transmission device 100 includes a substrate 10, an optical waveguide 20, a transmission-side optical module 30, and a reception-side optical module 40, as illustrated in FIG. 1. In the following description, a direction perpendicular to an upper surface and a lower surface of the substrate 10 is a Z-axis direction, a direction in which the optical waveguide 20 extends in a plane parallel to the upper surface and the lower surface of the substrate 10 is a Y-axis direction, and a direction which intersects perpendicularly with the Z-axis and the Y-axis is an X-axis direction.

The substrate 10 is a PCB (Printed Circuit Board). Openings 10a and 10b which penetrate in the Z-axis direction are formed on a part of the substrate 10. Various electronic components (i.e., package), not shown, are provided on the substrate 10.

The optical waveguide 20 is a linear component which extends in the Y-axis and can transmit a light. As an example of the optical waveguide 20, an optical fiber can be used. The optical fiber used as the optical waveguide 20 has a portion (i.e., a core) with a high refractive index which the light passes, and a portion (i.e., a clad) with a low refractive index which surround the core. A waveguide mirror 22 which has a reflective surface (e.g. the surface having 50 μm square) inclined +45 degrees (or −45 degrees) against an XZ plane is provided near a −Y side end of the optical waveguide 20. A waveguide mirror 24 which has a reflective surface (e.g. a surface having 50 μm square) inclined −45 degrees (or +45 degrees) against the XZ plane is provided near a +Y side end of the optical waveguide 20. Here, each of the waveguide mirrors 22 and 24 can be formed by notching a part of the optical waveguide 20 in the form of a mountain (i.e., cutting it at 45 degrees), and performing surface processing (e.g. gold evaporation) on the notching portion. In the present embodiment, a plurality of optical waveguides 20 are provided along the X-axis direction. The waveguide mirror 22 of each optical waveguide 20 is located above the opening 10a of the substrate 10 (i.e., +Z direction), and the waveguide mirror 24 of each optical waveguide 20 is located above the opening 10b of the substrate 10 (i.e. +Z direction).

The transmission-side optical module 30 is electrically and mechanically connected to the substrate 10 via a bump 50a. Thereby, the transmission-side optical module 30 is electrically connected to a package, not shown. A device, such as a flip chip bonder, can be used for connection between the transmission-side optical module 30 and the substrate 10 through the bump 50a. Here, in FIG. 1, the bump 50a is used for the connection between the transmission-side optical module 30 and the substrate 10, but the connection method is not limited to this. For example, the transmission-side optical module 30 may be implemented on the substrate 10 by use of a socket or a PGA (Pin Grid Array).

The transmission-side optical module 30 includes a module body 32, a lens holding member 34, a lens 36, a light emitting element 38 as a light source, as illustrated in FIG. 1. The light emitting element 38 is a photonic device, such as a semiconductor laser. In the present embodiment, a surface emission-type laser (VCSEL: Vertical Cavity Surface Emitting LASER) having a size of about 20 to 30 μm in diameter can be used. Here, the light emitting element 38 and the lens 36 of the same number as the number of optical waveguides 20 (or the waveguide mirrors 22) are provided along the X-axis direction (here, only the single light emitting element 38 and the single lens 36 are illustrated in FIG. 1 and so on). That is, a laser light emitted towards a −Z direction from the single light emitting element 38 enters into the single optical waveguide 20 through a corresponding lens 36. Then, the laser light is reflected in a +Y direction with the waveguide mirror 22, and is transmitted in the +Y direction in the inside of the optical waveguide 20.

An ultraviolet curing resin 52a is applied between the transmission-side optical module 30 and the optical waveguide 20. The position relationship between the transmission-side optical module 30 and the optical waveguide 20 is fixed by the ultraviolet curing resin 52a.

As with the transmission-side optical module 30, the reception-side optical module 40 is electrically and mechanically connected to the substrate 10 via a bump 50b. Thereby, the reception-side optical module 40 is electrically connected to a package, not shown. As with the transmission-side optical module 30, the reception-side optical module 40 may be also implemented on the substrate 10 by use of the socket or the PGA.

The reception-side optical module 40 includes a module body 42, a lens holding member 44, a lens 46, and a light receiving element 48. Here, the light receiving element 48 and the lens 46 of the same number as the number of optical waveguides 20 (or the waveguide mirrors 24) are provided along the X-axis direction (here, only the single light receiving element 48 and the single lens 46 are illustrated in FIG. 1 and so on). Thereby, when the laser light that has been transmitted through each single optical waveguide 20 is reflected in the +Z direction with the waveguide mirror 24, the reflected laser light enters (or is received) into each light receiving element 48 via each lens 36.

An ultraviolet curing resin 52b is applied between the reception-side optical module 40 and the optical waveguide 20. The position relationship between the reception-side optical module 40 and the optical waveguide 20 is fixed by the ultraviolet curing resin 52b.

As described above, the optical transmission device 100 according to the present embodiment is an optical transmission device with multi-channels (i.e., multi-axes) in which the lights are transmitted from the plurality of light emitting elements 38 in the transmission-side optical module 30 to the plurality of light receiving elements 48 in the reception-side optical module 40.

Next, a detailed description will be given of a manufacturing device 200 of the optical transmission device 100 according to the present embodiment, based on FIGS. 2 and 3.

Figure 2:
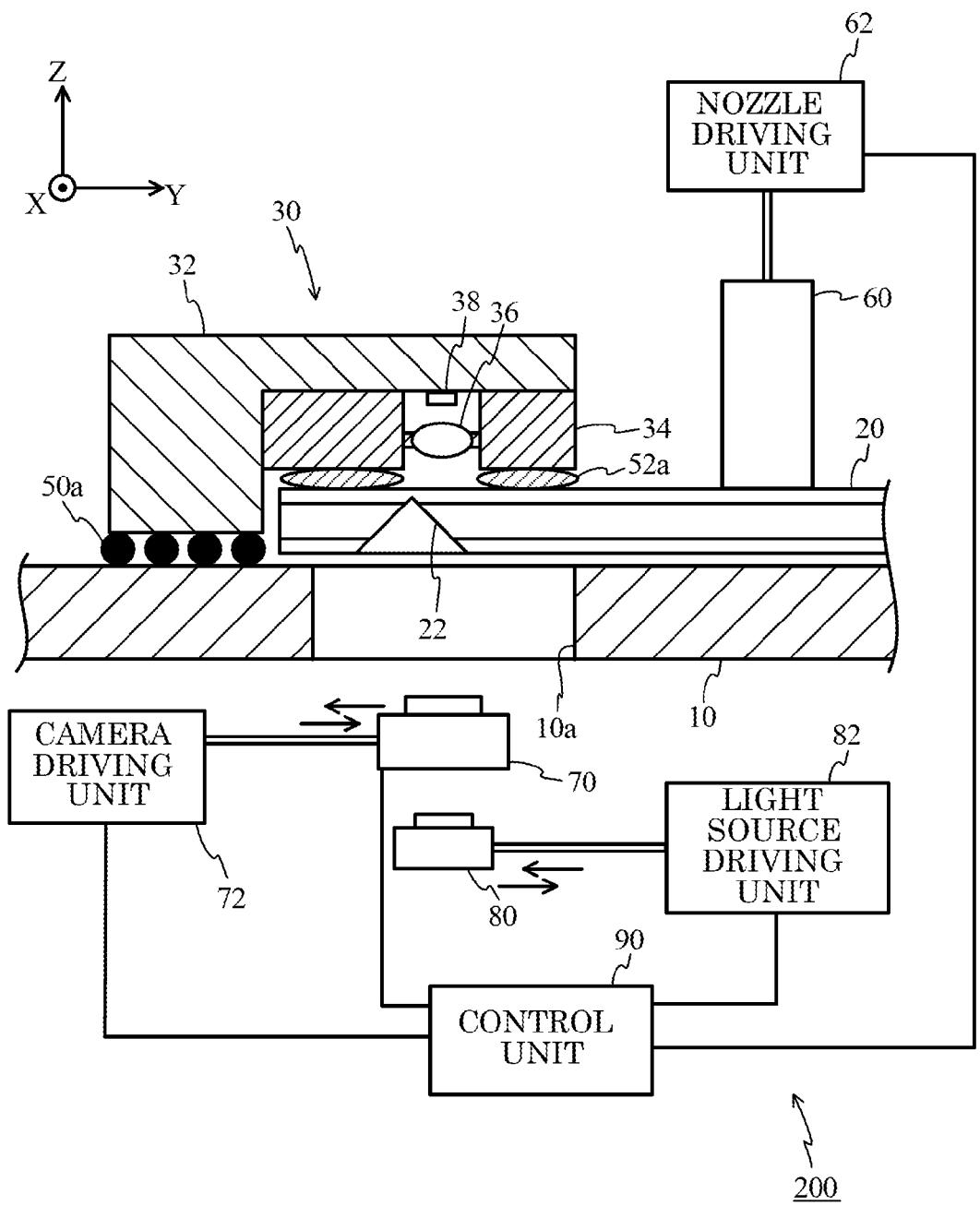
FIG. 2 is a diagram illustrating a state where a manufacturing device aligns a position relationship between a transmission-side optical module and an optical waveguide.
Figure 3:
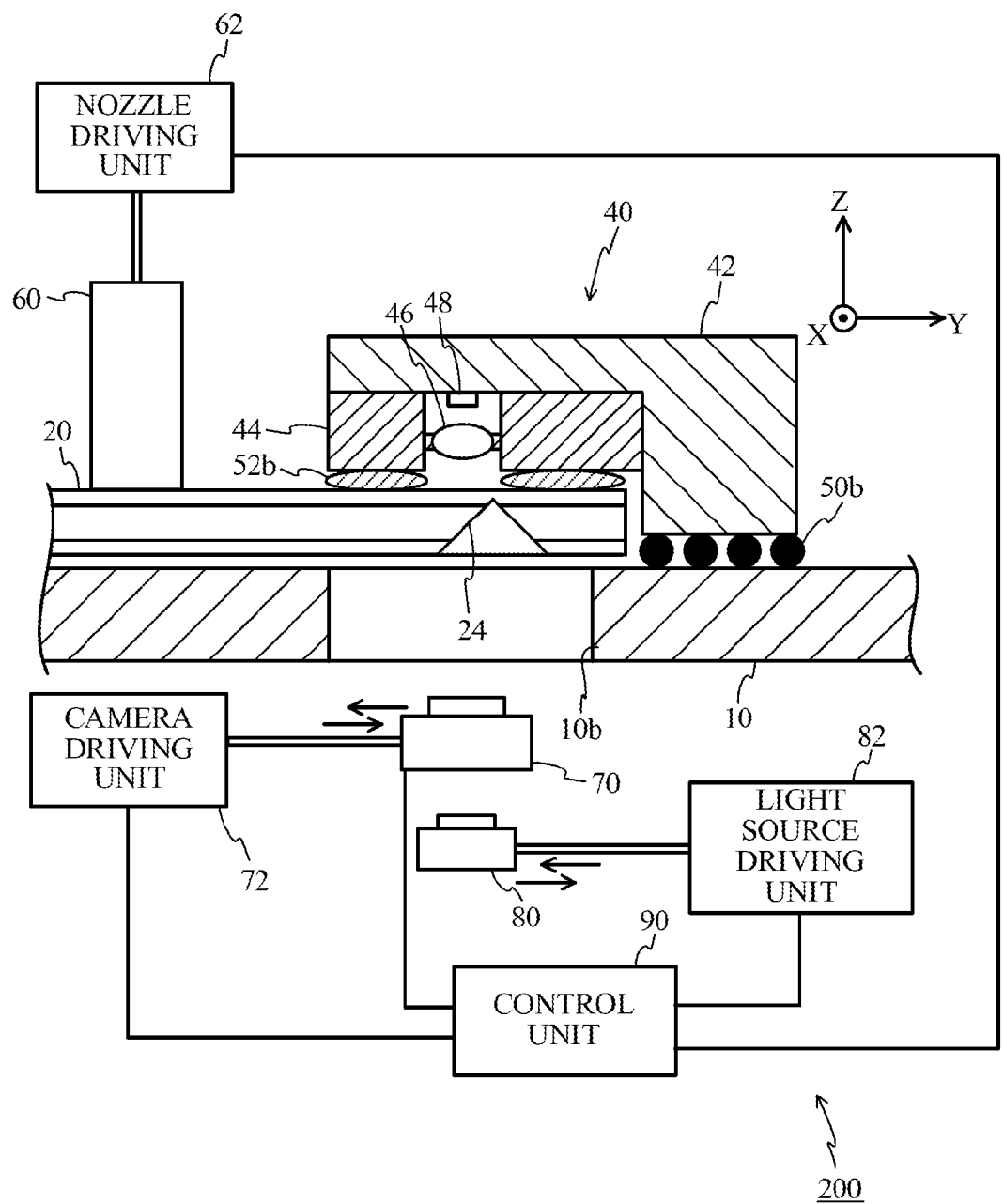
FIG. 3 is a diagram illustrating a state where the manufacturing device aligns a position relationship between a reception-side optical module and the optical waveguide.

FIGS. 2 and 3 schematically illustrate the configuration of the manufacturing device 200 of the optical transmission device 100. FIG. 2 illustrates a state where the manufacturing device 200 aligns the position relationship between the transmission-side optical module 30 and the optical waveguide 20. FIG. 3 illustrates a state where the manufacturing device 200 aligns the position relationship between the reception-side optical module 40 and the optical waveguide 20.

The manufacturing device 200 includes an adsorption nozzle 60, a nozzle driving unit 62, a camera 70 as a photographing device, a camera driving unit 72, a UV (ultraviolet) light source 80, a UV light source driving unit 82, and a control unit 90, as illustrated in FIGS. 2 and 3.

The adsorption nozzle 60 is a nozzle that can adsorb and hold a plurality of optical waveguides 20. The nozzle driving unit 62 includes a suction device that switches ON/OFF of the adsorptive power of the adsorption nozzle 60, and an actuator that moves the adsorption nozzle 60 in an XY plane.

The camera 70 photographs the optical waveguides 20 and the transmission-side optical module 30 or the reception-side optical module 40 from under the substrate 10 (i.e., from the −Z side) via the opening 10a or 10b. Here, a photography direction of the camera 70 is in agreement with the Z-axis direction. The camera driving unit 72 includes an actuator that places the camera 70 under the opening 10a or 10b and evacuates the camera 70 from under the opening 10a or 10b.

The UV light source 80 irradiates a ultraviolet light from under the substrate 10 (−Z side) and hardens the ultraviolet curing resin 52a or 52b. The UV light source driving unit 82 includes an actuator that places the UV light source 80 under the opening 10a or 10b and evacuates the UV light source 80 from under the opening 10a or 10b. The UV light source driving unit 82 also includes a switch device that switches ON/OFF of emission of the UV light (i.e., the ultraviolet light) from the UV light source 80.

The control unit 90 includes a CPU (Control Processing Unit), and totally controls each element of the manufacturing device 200.

Next, a detailed description will be given of a manufacturing method of the optical transmission device 100 using the manufacturing device 200 of FIGS. 2 and 3, based on FIGS. 4 to 8.

Figure 4:
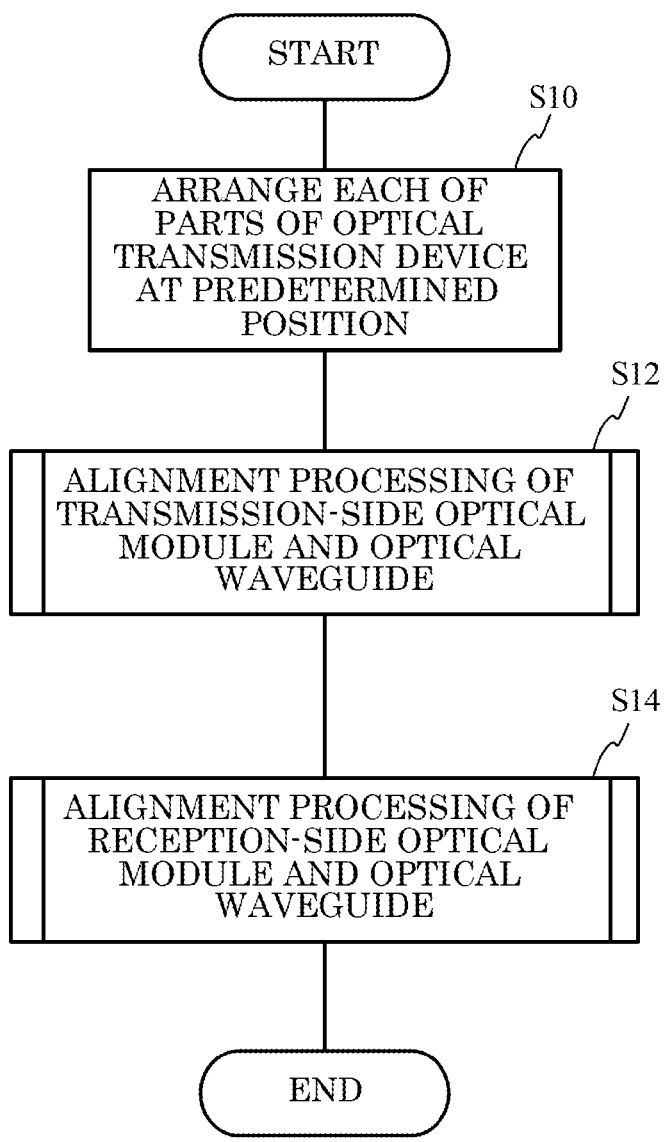
FIG. 4 is a flowchart illustrating a manufacturing process of the optical transmission device.
Figure 5:
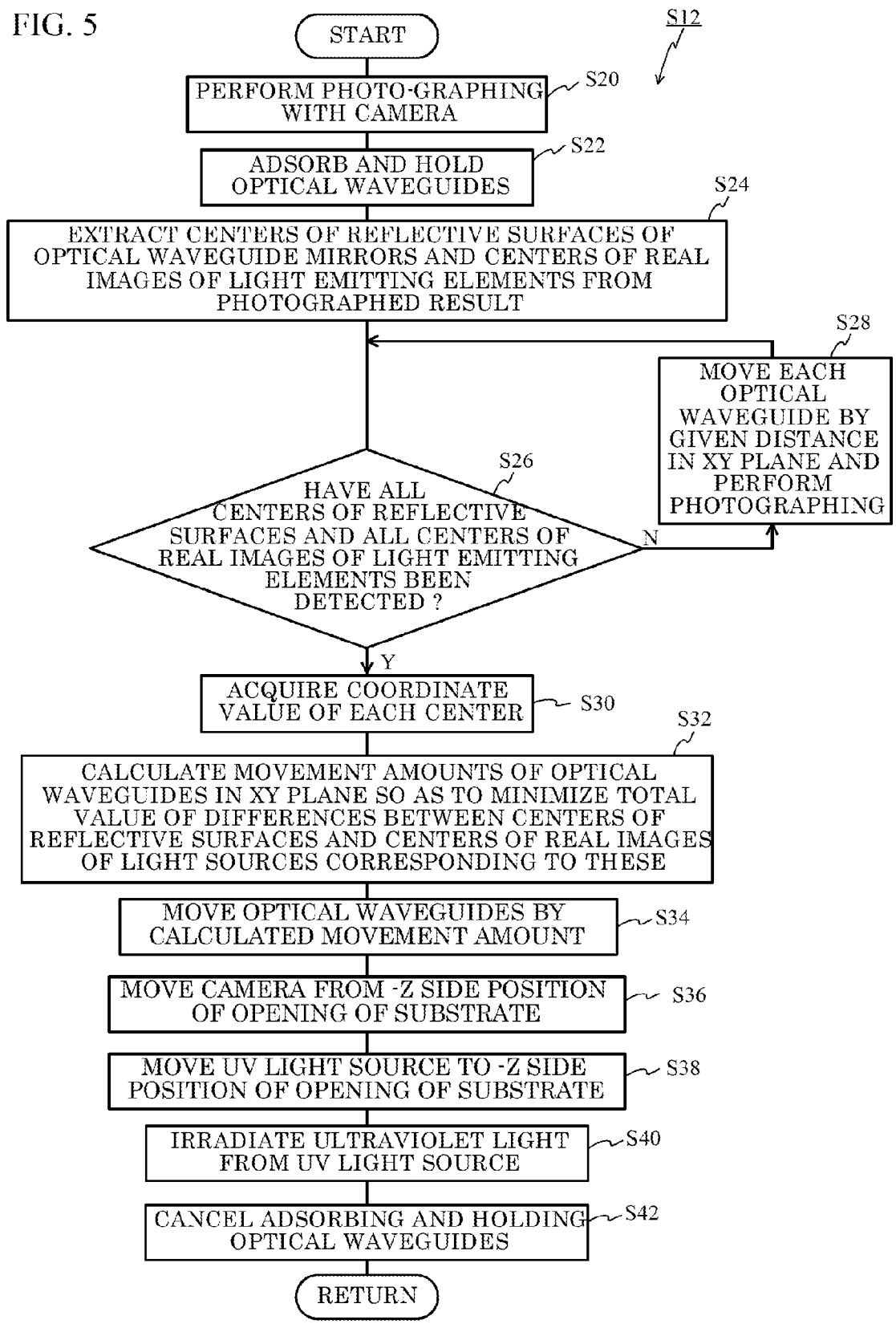
FIG. 5 is a flowchart illustrating a concrete process of step S12 in FIG. 4.
Figure 7:
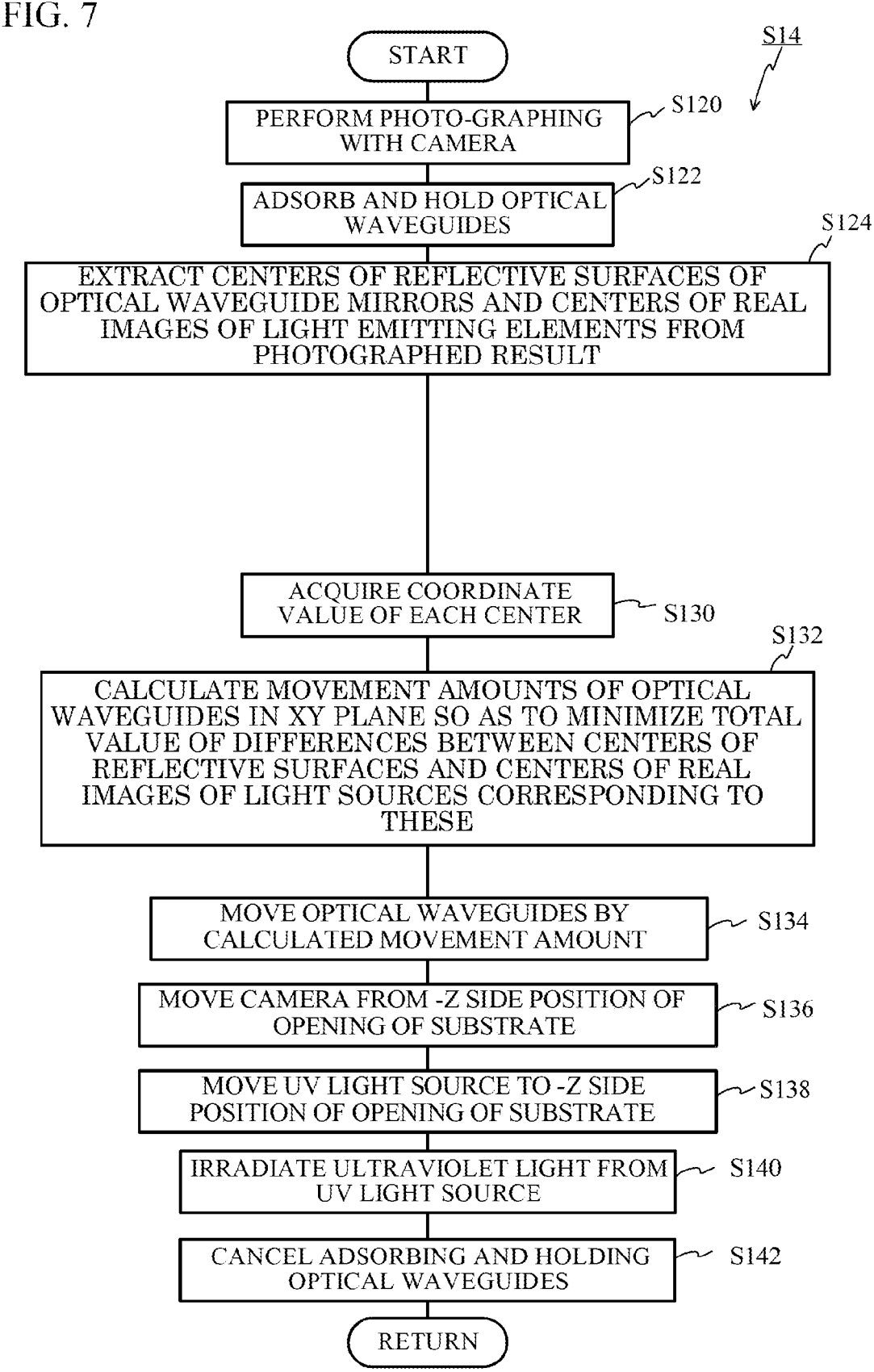
FIG. 7 is a flowchart illustrating a concrete process of step S14 in FIG. 4.

FIG. 4 is a flowchart illustrating a manufacturing process of the optical transmission device 100. FIG. 5 is a flowchart illustrating a concrete process of step S12 in FIG. 4. FIG. 7 is a flowchart illustrating a concrete process of step S14 in FIG. 4.

In processing of FIG. 3, first, each of parts of the optical transmission device 100 is arranged at a predetermined position in step S10. More specifically, the optical waveguide 20 is arranged on a +Z plane of the substrate 10 in a state where the transmission-side optical module 30 and the reception-side optical module 40 are fixed (or fixedly connected) on the substrate 10, as illustrated in FIG. 1. Although the ultraviolet curing resin 52a is applied between the optical waveguide 20, and the transmission-side optical module 30 and the reception-side optical module 40, it is assumed that the ultraviolet curing resins 52a and 52b are not irradiated with the ultraviolet light in this stage. That is, it is assumed that the position relationship between the optical waveguide 20, and the transmission-side optical module 30 and the reception-side optical module 40 is not fixed in this stage. Here, the processing of step S10 may be performed by an operator. In addition, the nozzle driving unit 62 drives the adsorption nozzle 60 under an instruction of the control unit 90, so that the processing of above-mentioned step S10 may be performed.

Next, in step S12, the control unit 90 performs a subroutine of alignment processing of the transmission-side optical module 30 and the optical waveguide 20. Specifically, the control unit 90 performs processing according to the flowchart of FIG. 5.

In the processing of FIG. 5, first, the control unit 90 controls the camera driving unit 72, arranges the camera 70 at the predetermined position (the position of FIG. 2) under the opening 10a, and then performs photographing by use of the camera 70 in step S20.

Next, in step S22, the control unit 90 controls the nozzle driving unit 62, and hence causes the adsorption nozzle 60 to adsorb and hold the optical waveguides 20. Next, in step S24, the control unit 90 acquires a result of an image photographed with the camera 70, and extracts the centers of the reflective surfaces of the plurality of waveguide mirrors 22 and the centers of real images (i.e., the centers of image formation) of the plurality of light emitting elements 38. Here, the centers of real images of the light emitting elements 38 photographed with the camera 70 are optical-axis centers of the transmission-side optical module 30 (i.e., optical-axis centers of lights emitted from the transmission-side optical module 30).

Figure 6A:
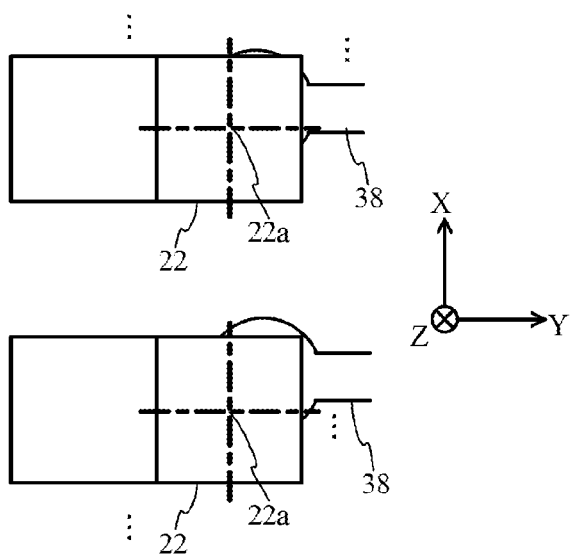
FIGS. 6A to 6C are diagrams explaining the process of FIG. 5.
Figure 6B:
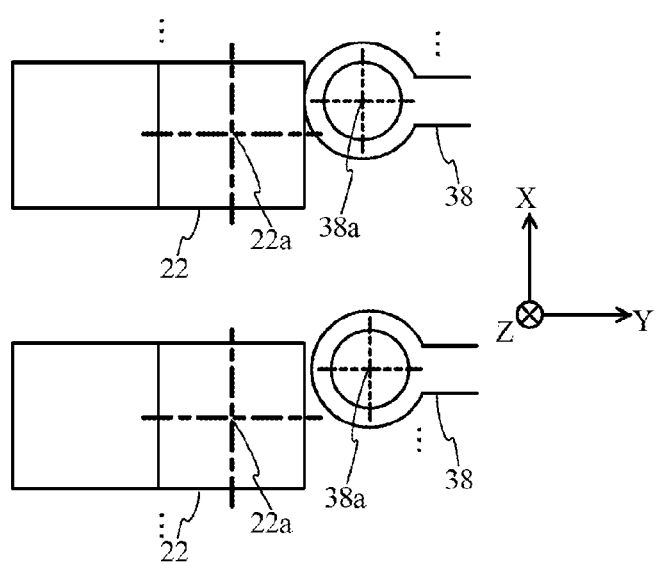

When the photographed result (i.e., a photographed image) as illustrated in FIG. 6B has been acquired in step S24, the control unit 90 can extract the centers 22a of the reflective surfaces (i.e., areas in the right half of rectangles) of the waveguide mirrors 22 and the centers 38a of the real images of the light emitting elements 38. Here, as an example, each center 22a of the reflective surface of the waveguide mirror 22 is an intersection point of perpendicular bisectors of sides extending in the X-axis and the Y-axis directions of the reflective surface. Alternatively, each center 22a of the reflective surface of the waveguide mirror 22 is an intersection point of two diagonal lines of the reflective surface. As an example, each center 38a of the real image of the light emitting element 38 is an intersection point of perpendicular bisectors relating to two different chords of the real image (i.e., a circle). When the photographed result as illustrated in FIG. 6A has been acquired, the control unit 90 can extract the centers 22a of the reflective surfaces of the waveguide mirrors 22, but cannot extract the centers 38a of the real images of the light emitting elements 38.

In the present embodiment, as understood from FIG. 2, the camera 70 photographs the real images of the light emitting elements 38 in a state where the optical waveguides 20 are penetrated. Therefore, it is preferable to adopt polymethyl methacrylate, polycarbonate, polystyrene, epoxy-based polymer, fluorine-based polymer, or silica (Si) as a material of the optical waveguides 20. Since the optical waveguides 20 formed with the material are transparent in a visible light band, the camera 70 can photograph the real images of the light emitting elements 38 through the optical waveguides 20. Here, when a material with the highest transmissivity in an infrared wavelength band or an ultraviolet wavelength band is adopted as the material of the optical waveguides 20, a camera having an image sensor which can receive and photograph a light from the wavelength band may be used.

Next, in step S26, the control unit 90 determines whether the centers 22a of the reflective surfaces of all the waveguide mirrors 22 and the centers 38a of the real images of all the light emitting elements 38 have been detected. When the answer to the determination is NO, i.e., the photographed result as illustrated in FIG. 6A has been acquired, the processing proceeds to step S28.

When the processing proceeds to step S28, the control unit 90 moves each optical waveguide 20 by a given distance in the XY plane by controlling the nozzle driving unit 62, and causes the camera 70 to perform photographing again. Here, the given distance is a predetermined distance. After the processing of step S28, the processing returns to step S26.

On the contrary, when the answer to the determination is YES, i.e., the photographed result as illustrated in FIG. 6B has been acquired, the processing proceeds to step S30, and the control unit 90 acquires a coordinate value of each center from the photographed result.

Next, in step S32, the control unit 90 calculates differences between the centers 22a of the reflective surfaces of the waveguide mirrors 22 and the centers 38a of the real images of corresponding light emitting elements 38, and calculates movement amounts of the optical waveguides 20 in the XY plane so as to minimize a total value of the calculated differences. It is assumed that, for example, a difference (here, the difference is not an absolute value but includes information on positive/negative, and ditto hereunder) relating to the X-axis direction between the center 22a of the reflective surface of a certain waveguide mirror 22 and the center 38a of the real image of the light emitting element 38 corresponding to this is "ax", a difference relating to the Y-axis direction is "ay", a difference relating to the X-axis direction between the center 22a of the reflective surface of another waveguide mirror 22 and the center 38a of the real image of the light emitting element 38 corresponding to this is "bx", a difference relating to the Y-axis direction is "by", . . . a difference relating to the X-axis direction between the center 22a of the reflective surface of the other waveguide mirror 22 and the center 38a of the real image of the light emitting element 38 corresponding to this is "nx", and a difference relating to the Y-axis direction is "ny". In this case, the control unit 90 calculates values of "x" and "y" in which values X and Y of the following formulas (1) and (2) are minimum, as movement amounts relating to the X-axis and the Y-axis directions.

$$X = (ax+x) + (bx+x) + \ldots + (nx+x) \tag{1}$$

$$Y = (ay+y) + (by+y) + \ldots + (ny+y) \tag{2}$$

Here, when the movement amounts of the optical waveguides 20 in the XY plane are calculated, movement amounts relating to rotational directions around the Z-axes of the optical waveguides 20 may be taken into consideration.

Next, in step S34, the control unit 90 controls the nozzle driving unit 62 to move the optical waveguides 20 by the movement amount (x, y) calculated in step S32. Thereby, the position relationship between the optical waveguides 20 and the transmission-side optical module 30 becomes a suitable state (i.e. a state with few optical loss).

Next, in step S36, the control unit 90 controls the camera driving unit 72 to evacuate the camera 70 from under the opening 10*a* of the substrate 10 (a −Z side position) by controlling the camera driving unit 72. Next, in step S38, the control unit 90 controls the UV light source driving unit 82 to place the UV light source 80 under the opening 10*a* of the substrate 10 (the −Z side position). Then, in step S40, the control unit 90 controls the UV light source driving unit 82 to irradiate a ultraviolet light from the UV light source 80. Thereby, since the ultraviolet curing resin 52*a* between the optical waveguides 20 and the transmission-side optical module 30 is hardened, the position relationship between the optical waveguides 20 and the transmission-side optical module 30 is fixed in the suitable state (i.e., the state with few optical loss).

Next, in step S42, the control unit 90 controls the nozzle driving unit 62, and hence causes the adsorption nozzle 60 to cancel adsorbing and holding the optical waveguides 20. According to the above-mentioned processing, when the processing (step S12) of FIG. 5 is finished, the control unit 90 proceeds to step S14 of FIG. 4.

When the processing proceeds to step S14 of FIG. 4, the control unit 90 performs a subroutine of alignment processing of the reception-side optical module 40 and the optical waveguide 20. In step S14, the control unit 90 performs processing according to the flowchart of FIG. 7.

Figure 8A:
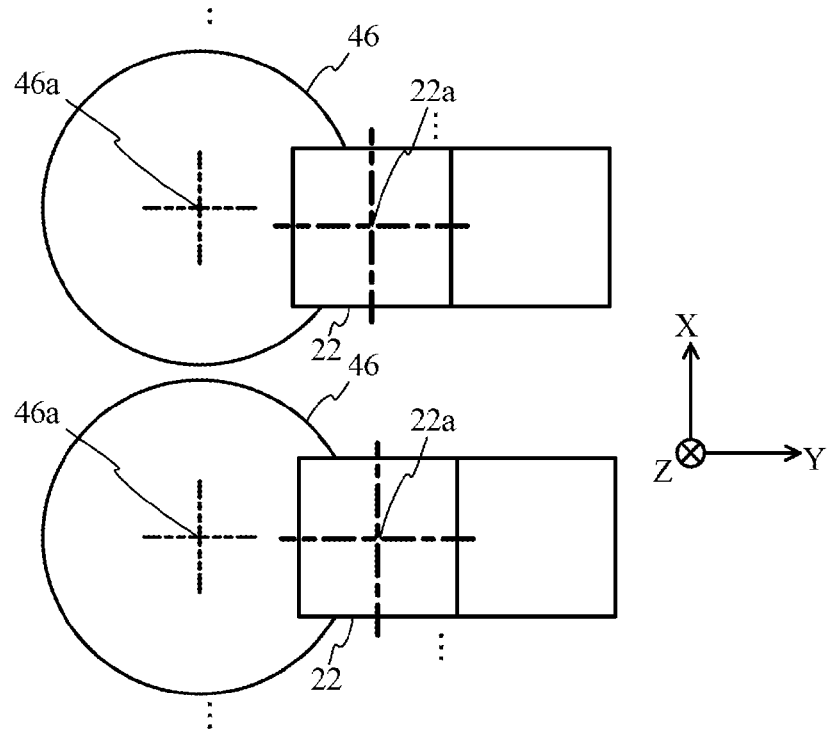
FIGS. 8A and 8B are diagrams explaining the process of FIG. 7.
Figure 8B:
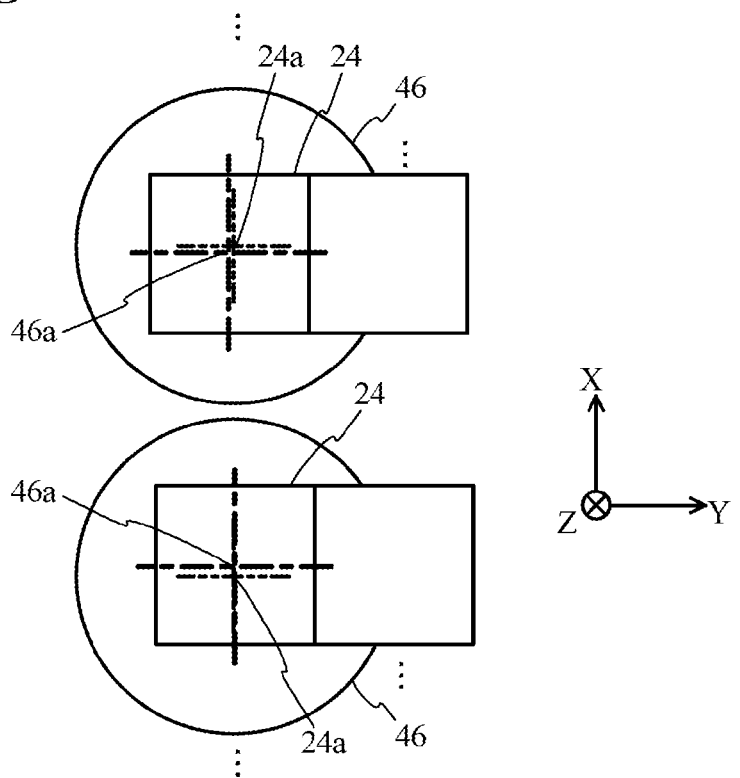

In the processing of FIG. 7, first, the control unit 90 controls the camera driving unit 72 to place the camera 70 under the opening 10*b* (at a position of FIG. 3) and perform photographing with the camera 70. It is assumed that, in this case, images to be photographed are images as illustrated in FIGS. 8A and 8B. In the images of FIGS. 8A and 8B, a plurality of lenses 46 and a plurality of waveguide mirrors 24 are photographed. In the present embodiment, since a diameter of each lens 46 is larger than that of each light emitting element 38 of FIGS. 6A to 6C, a center 46*a* of each lens 46 can be extracted irrespective of the position relationship between the lens 46 and the waveguide mirror 24.

Next, in step S122, the control unit 90 controls the nozzle driving unit 62, and hence the nozzle driving unit 62 causes the adsorption nozzle 60 to adsorb and hold the optical waveguides 20, as with step S22 of FIG. 5. Next, in step S124, the control unit 90 acquires the photographed result by the camera 70, and extracts the centers 24*a* of the reflective surfaces of all waveguide mirrors 22 and the centers 46*a* of all lenses 46. Here, as an example, each of the centers 46*a* of the lenses 46 is an intersection point of perpendicular bisectors relating to two different chords of the lens 46 (i.e. a circle). Here, each of the centers 46*a* of the lenses 46 photographed with the camera 70 is an optical-axis center of the reception-side optical module 40 (i.e., the optical-axis center of the light which enters into the reception-side optical module 40).

Then, the control unit 90 performs the processing of steps S130 to S142, as with steps S30 to S42 of FIG. 5. Thereby, the position relationship between the optical waveguides 20 and the reception-side optical module 40 can be fixed at a position (e.g. a position of FIG. 8B) where a total value of differences between the centers 24*a* of the reflective surfaces of the waveguide mirrors 24 and the centers 46*a* of the lenses 46 corresponding to there is minimum.

As described above, when all processing of FIG. 7 finishes, the processing of FIG. 4 (i.e., control steps of the optical transmission device 100) finishes.

As understood from the above-mentioned explanation, in the present embodiment, an alignment device that aligns the position relationship between the waveguide mirrors 22 and 24, and the transmission-side optical module 30 and the reception-side optical module 40 is realized by the adsorption nozzle 60, the nozzle driving unit 62 and the control unit 90 as an example. Moreover, a fixing device that fixes the position relationship between the optical waveguides 20, and the transmission-side optical module 30 and the reception-side optical module 40 is realized by the UV light source 80, the UV light source driving unit 82 and the control unit 90, as an example.

As described above, according to the present embodiment, the optical waveguides 20, the transmission-side optical module 30 including the light emitting elements 38, and the reception-side optical module 40 including the light receiving elements 48 are arranged on the +Z side of the substrate 10 (S10). The control unit 90 photographs the waveguide mirror 22 or 24, and the optical module 30 or 40 corresponding to the waveguide mirror 22 or 24, via the opening 10*a* or 10*b* of the substrate 10, by use of the camera 70 (S20 and S120). Then, the control unit 90 detects the optical-axis centers 38*a* or 46*a* of the optical module 30 or 40 from the photographed result, and detects the centers 22*a* or 24*a* of the reflective surfaces of the waveguide mirrors 22 or 24 corresponding to the detected optical-axis centers (S30 and S130). Moreover, the control unit 90 aligns the position relationship between the optical waveguides 20 and the optical module 30 or 40 based on the detection result (S32, S34, S132 and S134), and fixes the position relationship (S40 and S140). Thus, in the present embodiment, by using the position relationship between the optical-axis centers 38*a* or 46*a* of the optical module and the centers 22*a* or 24*a* of the reflective surfaces of the waveguide mirrors 22 or 24, which are detected based on the result photographed via the opening 100*a* or 10*b*, the position relationship between the optical waveguides 20 and the optical module 30 or 40 can be aligned and fixed with high accuracy. Thereby, it is possible to reduce the optical loss in the optical transmission device 100, and to realize high-speed transmission of a large amount of data. According to the present embodiment, compared with a case where the position relationship between the optical waveguides 20 and the optical module 30 or 40 is aligned while a worker is viewing the position relationship, the position alignment can be performed correctly in a short time. Moreover, according to the present embodiment, in the optical transmission device 100 with multi-channels (i.e. multi-axes) in which the exact alignment by viewing is difficult, the position relationship between the optical waveguides 20 and the optical module 30 or 40 can be aligned properly.

In the present embodiment, the differences between the centers of the reflective surfaces of the waveguide mirrors 22 or 24 and the centers of the real image of the corresponding light emitting elements 38 or the centers of the lenses 46 are calculated, and the position relationship between the optical waveguides 20 and the optical module 30 or 40 is aligned so as to minimize the total of the differences. Thereby, even when there are the plurality of optical waveguides 20 (i.e., the case of multi-channels or multi-axes), the position relationship between the optical waveguides 20 and the optical module 30 or 40 can be aligned and fixed with high accuracy.

In the present embodiment, the position relationship between the optical waveguides 20 and the optical module 30 or 40 is fixed by use of the UV light from the UV light source 80 (i.e., the ultraviolet curing resin 52*a* or 52*b*) without using heat. Thereby, it is possible to prevent a position gap (i.e., an optic-axis gap) by heat from arising after the position relationship between the optical waveguides 20 and the optical module 30 or 40 is aligned. Here, although the optical module 30 or 40 is fixed (or fixedly connected) to the substrate 10 via the bump 50*a* or 50*b*, the fixation is performed before the position relationship between the optical waveguides 20 and the optical module 30 or 40 is aligned, and hence a problem does not occur.

Here, in the above-mentioned embodiment, it is explained in steps S132 and S134 that the control unit 90 calculates positions of the optical waveguides 20 in which the total value of the differences between all the optical-axis centers 46*a* of the reception-side optical module 40 and the centers 24*a* of the reflective surfaces of the corresponding waveguide mirrors 24 is minimum, and moves the optical waveguides 20 to the calculated positions. However, the control of the control unit 90 is not limited to this. The control unit 90 may perform processing of steps S132*a*', S132*b*' and S134' illustrated by surrounding with a two-dot chain line of FIG. 9, on behalf of steps S132 and S134.

Figure 9:
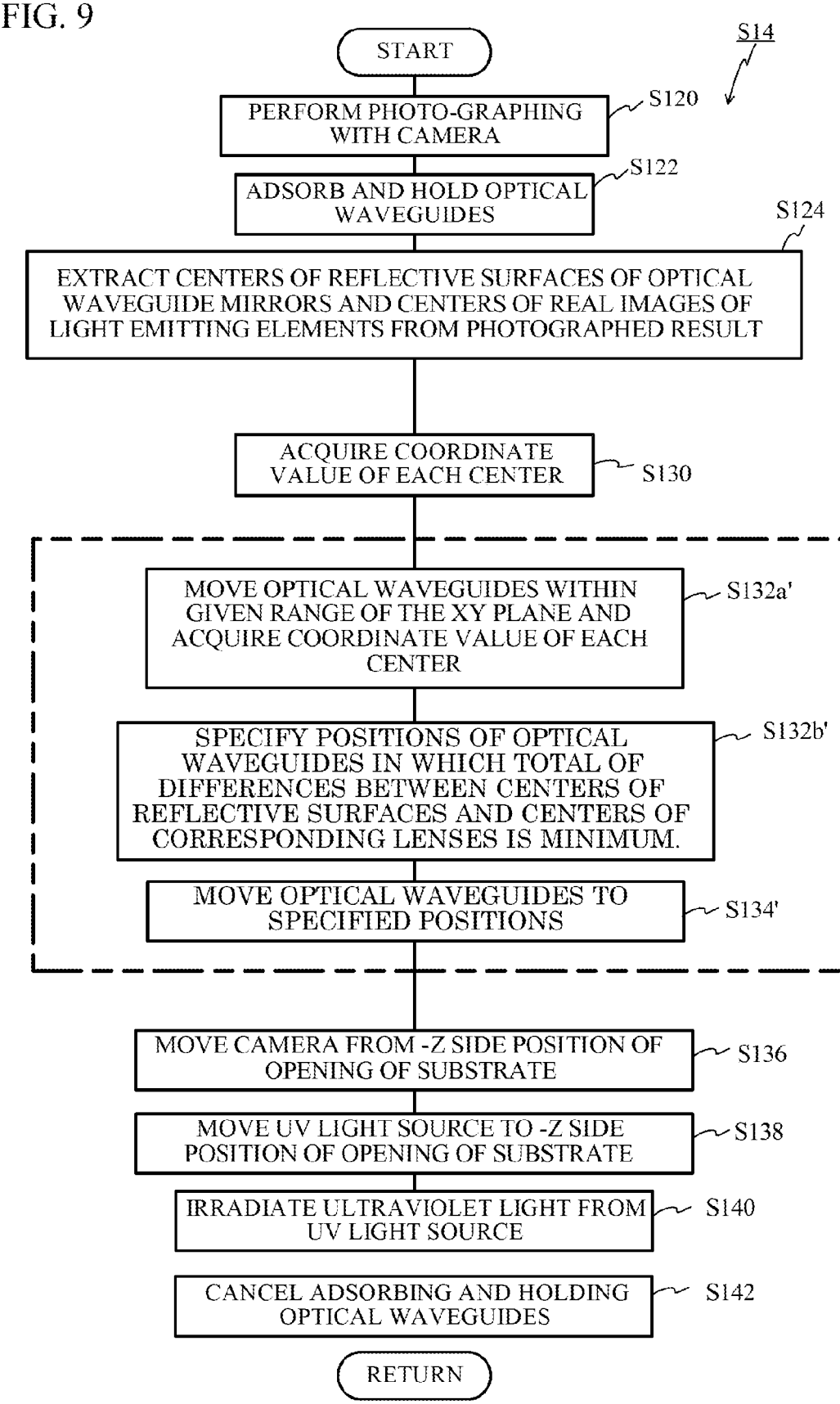
FIG. 9 is a flowchart illustrating a variation example of a process of step S14.

In step S132*a*' of FIG. 9, the control unit 90 controls the nozzle driving unit 62 to move the adsorption nozzle 60 in the XY plane, so that the control unit 90 moves the optical waveguides 20 within a given range of the XY plane. Then, while moving the optical waveguides 20, the control unit 90 acquires coordinate values (i.e., variation of coordinate values) of the centers 24*a* of the reflective surfaces of the waveguide mirrors 24 and the centers 46*a* of the lenses 46 corresponding to these. In this case, the control unit 90 acquires coordinate values (i.e., variation of coordinate values) of the centers 24*a* of the reflective surfaces of all the waveguide mirrors 24 and the centers 46*a* of the lenses 46 corresponding to these, which are photographed with the camera 70.

Next, in step S132*b*', while moving the optical waveguides 20, the control unit 90 specifies positions of the optical waveguides 20 in which the total value of the differences between the centers 24*a* of the reflective surfaces of all the waveguide mirrors 24 and the centers 46*a* of the corresponding lenses 46 is minimum. Then, in step S134', the control unit 90 controls the nozzle driving unit 62 to move the optical waveguides 20 at the positions specified in step S132*b*'.

Thus, the control unit 90 performs the processing of step S132*a*' to S134', so that appropriate positions of the optical waveguides 20 can be acquired without calculation, and the appropriate position relationship between the optical waveguides 20 and the optical module 30 or 40 can be fixed. Here, in step S132*a*', the control unit 90 may moves not only the optical waveguides 20 in the X-axis direction and the Y-axis direction, but also rotates the optical waveguides 20 around the Z-axis (i.e., the postures of the optical waveguides 20 in the XY plane are changed). Thereby, in steps S132*b*' and S134', the optical waveguides 20 can be made into appropriate postures.

Figure 6C:
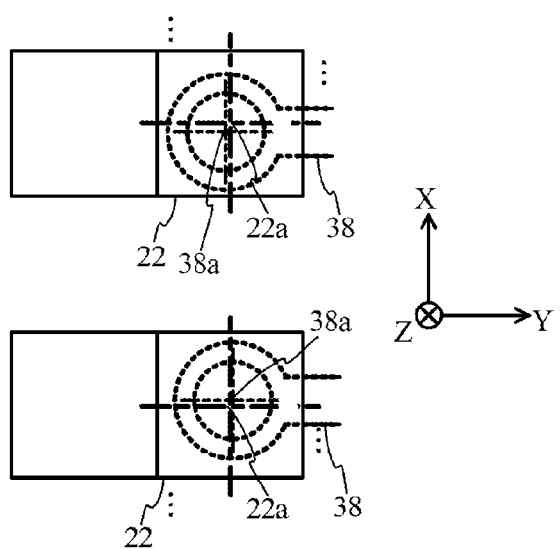

Here, a sufficiently transparent material (e.g. transmissivity more than 70 percents) in the visible wavelength band of the image sensor of the camera 70 may be selected as a material of the waveguide mirrors 22. In this case, even when the waveguide mirrors 22 are overlapped with the real images of the light emitting elements 38 as illustrated in FIG. 6C, the centers of the real images of the light emitting elements 38 can be acquired. In such a case, the same processing as the processing of FIG. 9 may be performed in the transmission-side optical module 30.

Here, in the above-mentioned embodiment, it is explained that the control unit 90 moves the optical waveguides 20 at positions where the total of the differences between the optical-axis centers of the optical module 30 or 40 and the centers of the reflective surfaces of the waveguide mirrors 22 or 24 is minimum. The movement method of the waveguides 20 is not limited to this. For example, the control unit 90 may move the optical waveguides 20 to positions where all the differences between the centers enter within a given threshold value (for example, less than 5 μm). In such a case, it is possible to reduce the optical loss in the optical transmission device 100, and to realize high-speed transmission of a large amount of data.

Here, in the above-mentioned embodiment, it is explained that the transmission-side optical module 30 and the reception-side optical module 40 have the lenses 36 and 46, respectively. The configuration of the transmission-side optical module 30 and the reception-side optical module 40 is not limited to this. At least one lens may be omitted. When the lenses 36 of the transmission-side optical module 30 are omitted for example, the control unit 90 detects the centers of the light emitting elements 38 from the photographed result, as the optical-axis centers of the transmission-side optical module 30. When the lenses 46 of the reception-side optical module 40 are omitted, the control unit 90 detects the centers of the light receiving elements 48 from the photographed result, as the optical-axis centers of the reception-side optical module 40.

Figure 10:
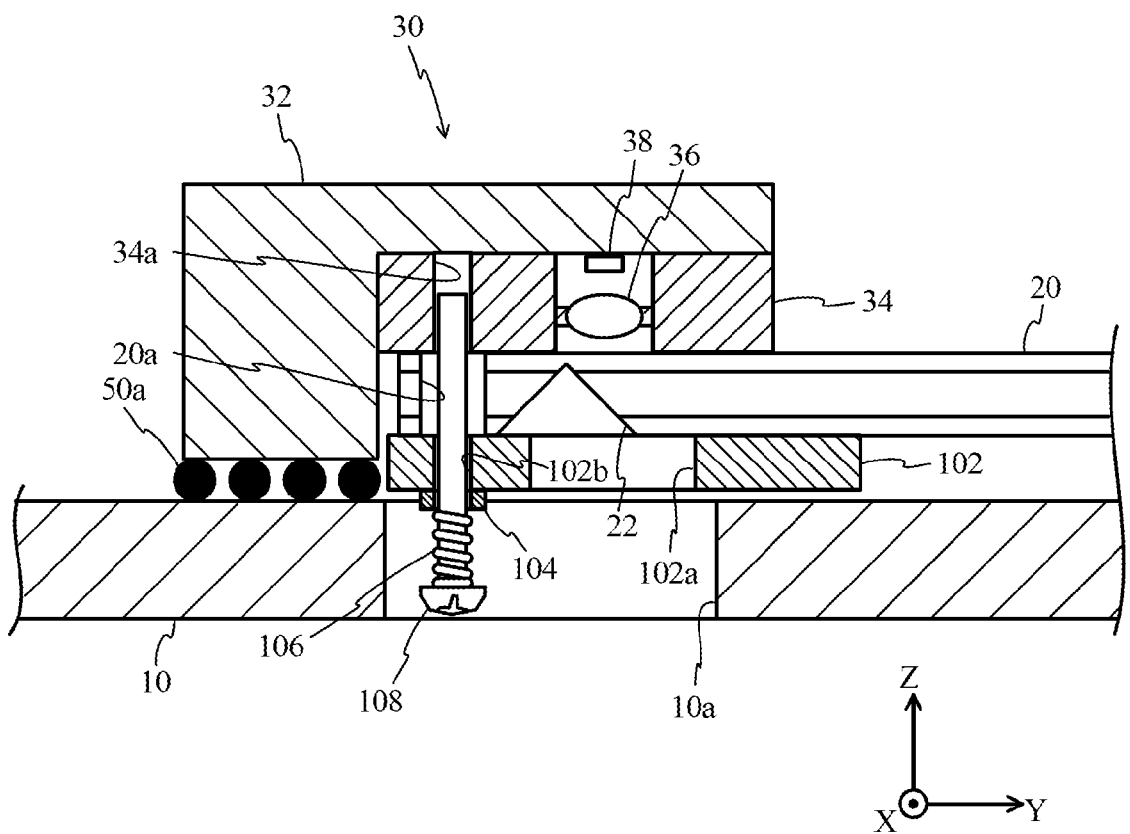
FIG. 10 is a diagram illustrating a variation example relating to a method fixing a position relationship between an optical module and the optical waveguide.

Here, although in the above-mentioned embodiment, it is explained that the ultraviolet curing resin is used to fix the position relationship between the optical module 30 or 40 and the optical waveguides 20, the fixation method of the optical waveguides 20 is not limited to this. For example, a pressing plate 102 having an opening 102*a* and a circular hole 102*b* may be provided under the optical waveguides 20, and the pressing plate 102 and the lens holding member 34 may sandwich the optical waveguides 20, as illustrated in FIG. 10. A screw 108 is screwed to a screw hole 34*a* formed in the lens holding member 34 in a state where the screw 108 is inserted into a compression coil spring 106, a washer 104, the circular hole 102*b* of the pressing plate 102, and a circular hole 20*a* formed in the optical waveguide 20. Thereby, the optical waveguide 20 can be fixed by a moderate frictional force. Even when such a configuration is adopted, the transmission-side optical module 30 and the optical waveguides 20 can be fixed without using heat, and hence the influence (i.e. the optic-axis gap) by heat can be prevented, as with the case where the ultraviolet curing resin is adopted. In FIG. 10, since the opening 102*a* is formed in the pressing plate 102, the camera 70 arranged on the −Z side of the substrate 10 can photograph the +Z side of the substrate 10, as with the above-mentioned embodiment. Here, although in FIG. 10, only the transmission-side optical module 30 is illustrated, the same configuration can be adopted to the reception-side optical module 40.

Here, although in the above-mentioned embodiment, it is explained that the transmission-side optical module 30 includes the plurality of light emitting elements 38 and lenses 36 per one module body 32, the configuration of the transmission-side optical module 30 is not limited to this. The transmission-side optical module 30 may include a plurality of module bodies 32, each of which includes one or more light emitting element 38 and one or more lenses 36. Similarly, the reception-side optical module 40 may include a plurality of module bodies 42, each of which includes one or more light receiving element 48 and one or more lenses 46.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A method for manufacturing an optical transmission device, comprising:

arranging, on one side of a substrate, a plurality of optical waveguides, a transmission-side optical module and a reception-side optical module, the plurality of optical waveguides including members extending along the one side of the substrate and waveguide mirrors optically coupled with the members, the transmission-side optical module including a plurality of light sources which emit lights to be transmitted through the plurality of optical waveguides, respectively, the reception-side optical module including a plurality of light receiving elements which receive the lights transmitted through the plurality of optical waveguides, respectively;

photographing, with a photographic device, at least one of the waveguide mirrors, and the transmission-side optical module or the reception-side optical module corresponding to the at least one of the waveguide mirrors, from another side of the substrate via an opening formed in the substrate;

detecting optical-axis centers of the transmission-side optical module or optical-axis centers of the reception-side optical module, and central positions of reflective surfaces of the waveguide mirrors corresponding to the optical-axis centers detected, from a result of the photographing; and aligning and fixing, on a basis of a result of the detecting, a position relationship between the plurality of optical waveguides and the transmission-side optical module or the reception-side optical module on the one side of the substrate to which the transmission-side optical module and the reception-side optical module are electrically and mechanically connected.

2. The method for manufacturing the optical transmission device as claimed in claim 1, wherein the aligning and fixing includes calculating that calculates differences between the optical-axis centers of the transmission-side optical module or the optical-axis centers of the reception-side optical module, and the central positions of the reflective surfaces of the waveguide mirrors corresponding to the optical-axis centers of the transmission-side optical module or the reception-side optical module, and the aligning and fixing includes minimizing a total value of the differences in the aligning and fixing of the position relationship.

3. The method for manufacturing the optical transmission device as claimed in claim 1, wherein the aligning and fixing includes calculating differences between the optical-axis centers of the transmission-side optical module or the optical-axis centers of the reception-side optical module, and the central positions of the reflective surfaces of the waveguide mirrors corresponding to the optical-axis centers of the transmission-side optical module or the reception-side optical module, and the aligning and fixing includes making each of the differences less than a given threshold value in the aligning and fixing of the position relationship.

4. The method for manufacturing the optical transmission device as claimed in claim 1, wherein the aligning and fixing includes fixing the position relationship without using heat.

5. A device for manufacturing an optical transmission device, comprising:

a photographic device that photographs at least one of waveguide mirrors, and a transmission-side optical module or a reception-side optical module corresponding to the at least one of the waveguide mirrors, from another side of a substrate via an opening formed in the substrate in a state where a plurality of optical waveguides, the transmission-side optical module and the reception-side optical module are arranged on one side of the substrate, the plurality of optical waveguides including members extending along the one side of the substrate and the waveguide mirrors optically coupled with the members, the transmission-side optical module including a plurality of light sources which emit lights to be transmitted through the plurality of optical waveguides, respectively, the reception-side optical module including a plurality of light receiving elements which receive the lights transmitted through the plurality of optical waveguides, respectively;

an alignment device that detects optical-axis centers of the transmission-side optical module or optical-axis centers of the reception-side optical module, and central positions of reflective surfaces of the waveguide mirrors corresponding to the optical-axis centers detected, from a result of the photographing of the photographic device, and aligns a position relationship between the waveguide mirrors and the transmission-side optical module or the reception-side optical module on a basis of a result of detection of the optical-axis centers and the central positions; and a fixation device that fixes the position relationship aligned between the plurality of optical waveguides and the transmission-side optical module or the reception-side optical module on the one side of the substrate to which the transmission-side optical module and the reception-side optical module are electrically and mechanically connected.

6. The device for manufacturing the optical transmission device as claimed in claim 5, wherein the alignment device performs processing that calculates differences between the optical-axis centers of the transmission-side optical module or the optical-axis centers of the reception-side optical module, and the central positions of the reflective surfaces of the waveguide mirrors corresponding to the optical-axis centers of the transmission-side optical module or the reception-side optical module, and aligns the position relationship between the waveguide mirrors and the transmission-side optical module or the reception-side optical module so as to minimize a total value of the differences calculated.

7. The device for manufacturing the optical transmission device as claimed in claim 5, wherein the alignment device performs processing that calculates differences between the optical-axis centers of the transmission-side optical module or the optical-axis centers of the reception-side optical module, and the central positions of the reflective surfaces of the waveguide mirrors corresponding to the optical-axis centers of the transmission-side optical module or the reception-side optical module, and aligns the position relationship between the waveguide mirrors and the transmission-side optical module or the reception-side optical module so that each of the differences calculated is less than a given threshold value.

8. The device for manufacturing the optical transmission device as claimed in claim 5, wherein the fixation device fixes the position relationship without using heat.

\* \* \* \* \*